United States Patent [19]

Eisenhour

[11] Patent Number: 4,567,867

[45] Date of Patent: Feb. 4, 1986

[54] ROTARY ENGINE

[76] Inventor: Ronald S. Eisenhour, 58 Mitchell, Charleston, Ill. 61920

[21] Appl. No.: 622,656

[22] Filed: Jun. 20, 1984

[51] Int. Cl.$^4$ ............................................. F02B 53/00
[52] U.S. Cl. ....................................... 123/241; 418/4; 418/61 R
[58] Field of Search ...................... 123/200, 241, 242; 418/4, 57, 58, 61 R

[56] References Cited

U.S. PATENT DOCUMENTS 1,087,735  2/1914  Dock .................................. 418/61 R
3,852,002  12/1974  Sieniawski ....................... 418/61 R Primary Examiner—Michael Koczo
Attorney, Agent, or Firm—Cullen, Sloman, Cantor, Grauer, Scott & Rutherford

[57] ABSTRACT

A rotary engine including a housing having a special planetary curved surface opening and including a drive shaft interconnected with a belt by a plurality of drive rollers. Chambers are formed between rotating planetary rollers which move within the opening and the belt. The belt has segmented lobes formed thereon which are moved about the drive rollers to compress the fluid in the chambers cyclically to perform work. An internal combustion rotary engine is disclosed in which a spark plug is secured to the housing at the point in the cycle where maximum pressure is developed in the chambers.

18 Claims, 10 Drawing Figures

ROTARY ENGINE

BACKGROUND OF THE INVENTION

This invention relates to a rotary engine of general application that may be an internal or external combustion engine.

Various rotary engines have been developed wherein a cycle of fluid intake, compression, ignition or heating, and fluid exhaust are used to convert thermal energy into mechanical energy. A well known type of rotary engine is the Wankel Engine wherein a rotating piston opens and closes ports in a cylinder wall so that the piston controls the intake and exhaust in the engine. The Wankel Engine employs a triangular piston which rotates in a housing having a epitrochoid opening. As the piston rotates, seals mounted in the three corners of the piston sweep the wall of the opening to define three enclosed spaces which successively increase and decrease in size to draw an air/fuel mixture into the chamber, compress the mixture prior to ignition, and discharge the exhaust gases through an outlet port.

One of the main problems with conventional rotary piston engines is maintaining a seal between the chambers of the engine. In rotary piston engines having a solid piston, the corners of the piston form a seal with the inner wall of the housing by sweeping against the inner wall in direct frictional contact resulting in the wear of the seals after extended use and an inherent loss of energy. Thus the present invention is directed to providing a rotary engine which eliminates the need for sweeping frictional contacts seal which contact the opening of the housing to maintain a seal between chambers.

SUMMARY OF THE INVENTION

In accordance with the present invention, a rotary internal combustion engine is disclosed which includes planetary rollers that form a seal between a specially shaped housing opening and an endless belt having lobes formed thereon for selectively pressurizing the chamber during the cycle of the rotary engine.

The housing includes an opening defined by a plane curved surface which is closed on first and second ends. A drive shaft is drive by driven rollers which in turn are rotated by a segmented link belt which turn planetary rollers. The planetary rollers are located between the plane curve surface of the housing and the belt to form a rolling seal between the belt and the opening in the housing separating the space therebetween into discrete chambers.

The lobes of the belt as they pass the mid-point between adjacent drive rollers are generally trochoidial in shape and are comprised of projections extending from the links of the belt. When the lobes pass around the drive roller the projections fan out.

The plane curved surface of the opening in the housing includes a recess formed opposite the mid-point of the endless belt between the adjacent drive rollers. The recess is dimensioned to permit said planetary rollers to ride over the lobes on the endless belt at the recess. The plane curve surface of the opening opposite the drive rollers is an arcuate section radially spaced from the drive roller a distance corresponding to the normal diameter of the planetary rollers.

The planetary rollers are slightly expandable to permit the roller to maintain sealing contact at the transition point between the recess and the portion of the plane curve surface adjacent to the drive rollers. The planetary rollers are constructed from a plurality of arcuate interlocking segments that are spring biased into a cylindrical configuration.

The planetary rollers permit a rolling seal between chambers of the engine and thereby virtually eliminate sliding frictional contact inherent in conventional rotary engines. It will be readily appreciated that an efficient durable rotary engine design is disclosed which eliminates the need for large area sliding contact seals.

Other advantages and meritorious features of the rotary engine of the present invention will be more fully understood from the following description of a preferred embodiment, the appended claims, the drawings, and a brief description of which follows.

DETAILED DESCRIPTION OF THE INVENTION

Figure 1:
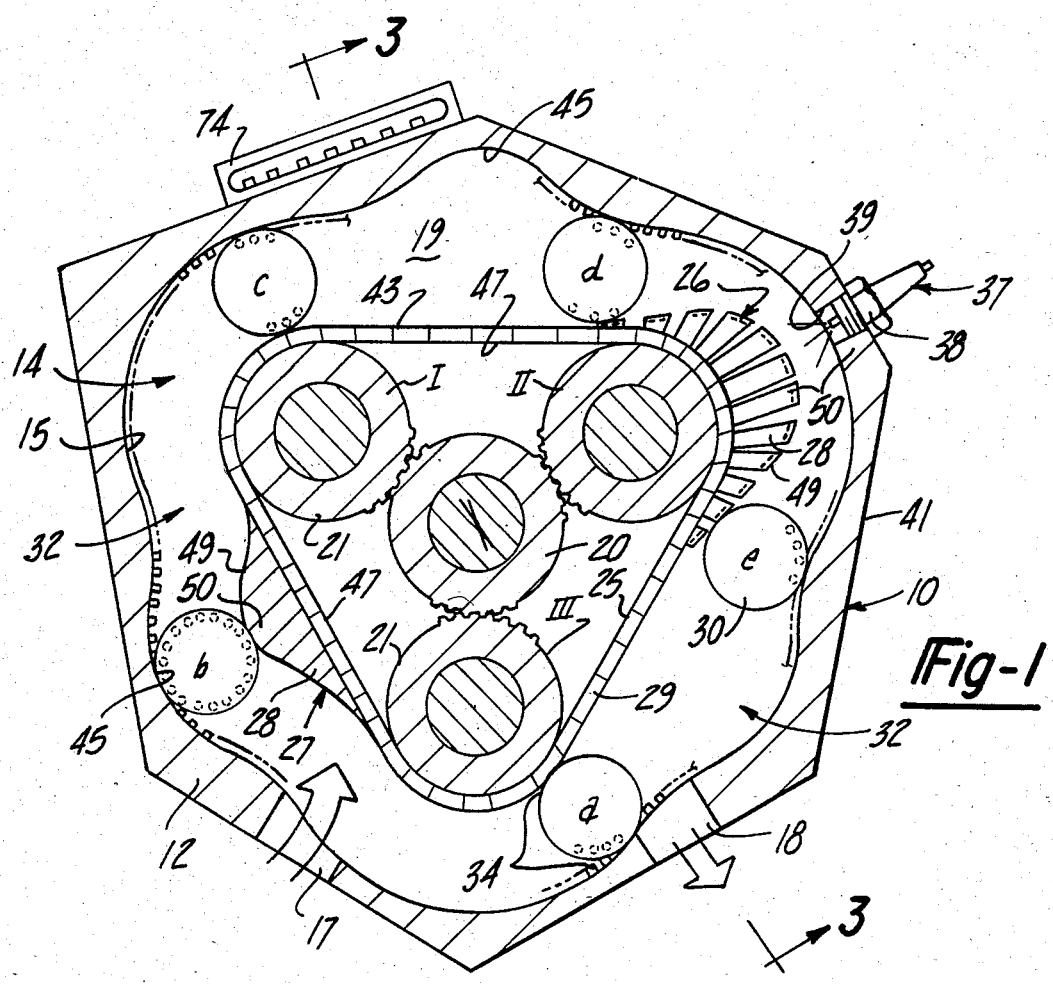
FIG. 1 is an end view of the internal combustion embodiment of the rotary engine in position for ignition.
Figure 2:
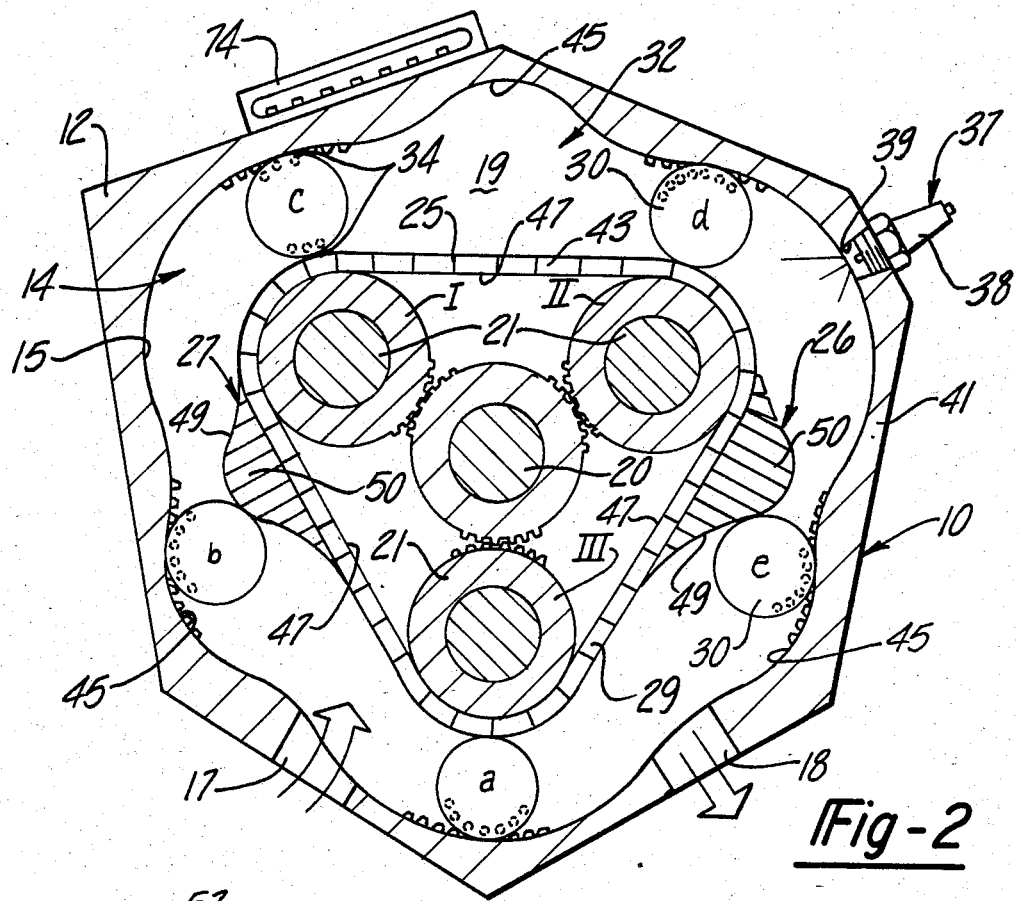
FIG. 2 is a diagrammatic view of the rotary engine of FIG. 1 after ignition during the drive portion of the cycle.
Figure 3:
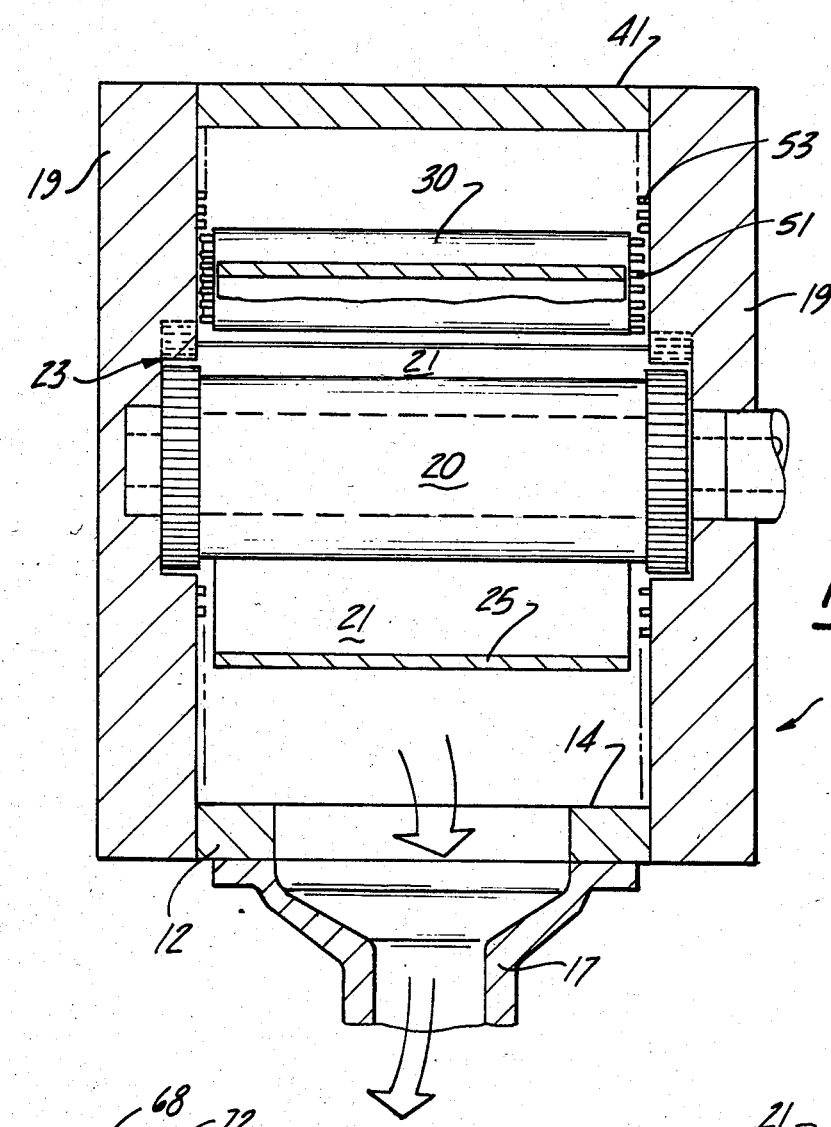
FIG. 3 is a cross sectional view taken along the line 3—3 in FIG. 1.
Figure 8:
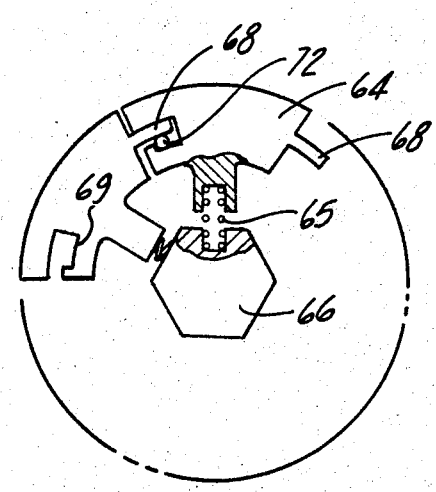
FIG. 8 is a cross sectional view of a segmented slightly expandable planetary roller.
Figure 9:
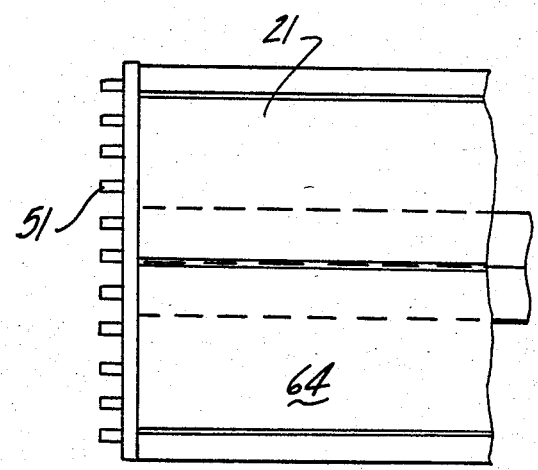
FIG. 9 is a elevational view of the segmented slightly expandable planetary roller.

Referring now to FIGS. 1 through 3 a rotary engine 10 is shown to include a housing 12 having an opening 14 defined by a special plane curved surface 15 which will be described more specifically below. Intake and exhaust ports 17 and 18 are formed through the housing 12 to permit the induction of a gas or fluid material through the intake port 17 and expulsion of a pressurized gas or fluid through the exhaust port 18. Opposite ends of the opening 14 and the housing 12 are closed by end caps 19.

The rotary motion developed by the rotary engine is transferred from the rotary engine 10 by means of a drive shaft 20, the drive shaft extends through one or both of the end caps 19 so that a transmission or other power takeoff apparatus (not shown) may operably engage the drive shaft 20. Drive rollers 21 engage the drive shaft 20 and impart rotational motion to the drive shaft 20 when the drive rollers 21 are rotated through a first gear means 23. In the illustrated embodiment, three drive rollers are arranged in an equilateral triangular array about the drive shaft 20. First gear means 23 are provided at opposite ends of the drive shaft 20 and the drive rollers 21 for transferring rotational motion from the drive rollers 21 to the drive shaft 20.

An endless belt 25 rides upon the drive rollers 21 in a tight anti-slip arrangement. The belt 25 includes first and second lobes 26 and 27 which are segmented members comprising a series of projections 28 secured to individual links 29 of the belt 25. As the belt 25 is forced to rotate by the operation of the rotary engine 10 the rotation of the belt is transferred in turn through the drive rollers 21 to the drive shaft 20.

Planetary rollers 30 are provided between the endless belt 25 and the opening 14 to define a plurality of moving chambers 32 between adjacent planetary rollers 30. In the illustrated embodiment, five planetary rollers 30 are provided which divide the space between the endless belt 25 and the opening 14 into five discrete chambers 32. A second gear means 34 is provided for controlling the movement of the planetary rollers 30 and transferring the rotational motion of the planetary rollers to the endless belt 25. The structure and operation of the second gear means 34 will be more fully described below.

A means 37 for heating the chambers 32 to increase the pressure within each chamber 32 preferably at the point in the cycle of the engine wherein the pressure within the chamber is at its maximum. Heating the gases in the chamber 32 produces work by applying force to the planetary rollers, forcing the roller to rotate toward the reduced pressure region adjacent to the exhaust port 18.

In the illustrated embodiment, the means 37 for heating the chamber 32 comprises a spark plug 38 which is used to ignite a combustible air/fuel mixture supplied through the intake port 17 which is compressed as the rotary engine 10 cycles. The spark plug 38 is received within a spark plug receptacle 39 at a fixed location in the housing 12 adjacent a point opposite one of the drive rollers. Compression is developed in the chamber adjacent the spark plug 38 by the first or second lobe 26, 27 being positioned in the chamber 32 when the spark plug is energized causing combustion within the chamber 32.

Alternatively the means for heating 37 may comprise a thermal energy source such as a gas or electric thermal energy source (not shown) positioned on or near the exterior 41 of the housing 12 adjacent the region wherein the lobes 26, 27 pass over a drive roller 21 and cause the gas or fluid in the chamber to be compressed by the co-location of the lobes 26, 27 in one of the chambers 32 as it passes about the drive roller 21. The endless belt 25 rides upon the drive rollers 21 and includes linear portions 43 between the spaced drive rollers 21. When first and second lobes 26 and 27 are located on the linear portion 43 of the belt the lobes assume a generally trochoidial shape. In a preferred embodiment, the lobes 26, 27 and the recesses 45 are identical in shape and dimension.

A recess 45 is formed in the plane curve surface 15 of the housing 12 opposite each linear portion 43 of the endless belt 25. The recess 45 is preferably a specially shaped surface defined by rolling one of the planetary rollers over one of the lobes 26, 27 of the belt 25 as the lobe moves along the linear portion of the belt between adjacent drive rollers whereby said planetary rollers maintain contact between the opening 14 and the belt 25 as the lobes 26, 27 move between adjacent drive rollers 21.

Projections 28 combine to form the first and second lobes 26, 27 and have a curved topped surface 49 so that when adjacent projections 28 are co-located adjacent one another and the lobe is on the linear portion 43 of the belt a smooth continuous surface is provided for the planetary rollers 30 to engage. The lobes 26 and 27 are symmetrical members increasing in length from opposite sides to a center projection 50 which is the maximum length projection 28. The angle of the surface 49 is kept to a very small value, preferably less that 18° as measured from the linear segment of the belt.

Figure 4:
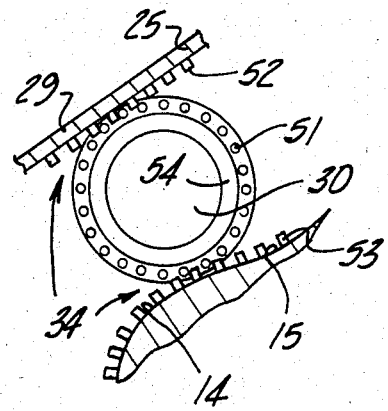
FIG. 4 is a fragmentary end view of the planetary roller as it engages the gear teeth of the opening and the belt.

Referring to FIG. 4, second gear means 34 is shown to comprise a plurality of studs 51 which extend from the ends of the planetary rollers 30 toward the end caps 19 of the housing 12. The studs 51 engage a first complementary set of gear teeth 52 formed on the endless belt 25. A second complementary set of gear teeth 53 are formed on the opposite ends of the plane curve surface adjacent the end caps 19 to engage the studs 51 on the planetary rollers 30. The first and second complementary gear teeth 52 and 53 prevent slippage of the planetary rollers and assure the proper relative location of the planetary rollers 30. A seal ring 54 is preferably provided concentrically relative to the studs 51 to complete the seal between chambers 32 on opposite sides of the planetary rollers 30.

Figure 5:
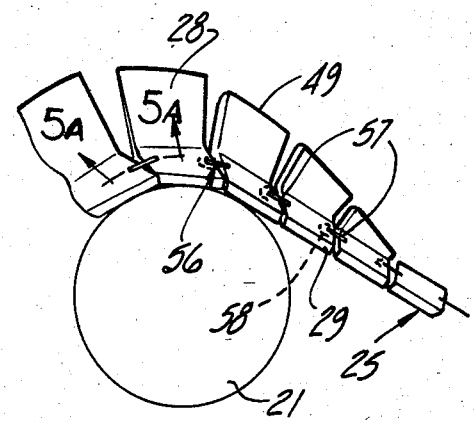
FIG. 5 is a fragmentary cross sectional view of the belt as the lobe portion passes over a drive roller.
Figure 6:
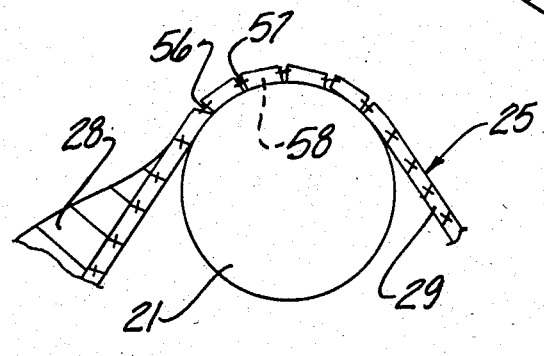
FIG. 6 is a fragmentary cross sectional view of the belt as the portion of the belt between the lobes passes over a drive roller.
Figure 5A:
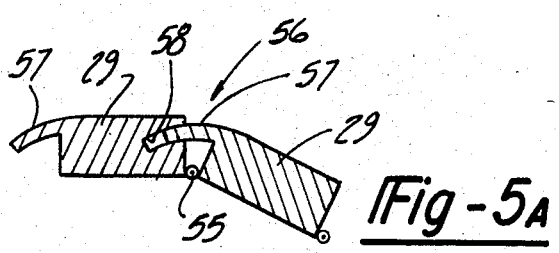
FIG. 5A is a cross sectional view of the belt taken along line 5A—5A in FIG. 5.

Referring to FIGS. 5 and 6, the endless belt 25 is constructed of a plurality of links 29 which are connected together by means of hinge members 55 to permit the links 29 to pivot as they move around the drive rollers 21. A seal 56 is assured at the hinge 55 by the provision of an arcuate flange 57 on one end of each link which is adapted to be received within an arcuate slot 58 in an adjacent link 29. In the illustrated embodiment each link 29 includes a flange 57 on one end and a slot 58 on the opposite end to permit interlocking adjacent links with one another.

Figure 7:
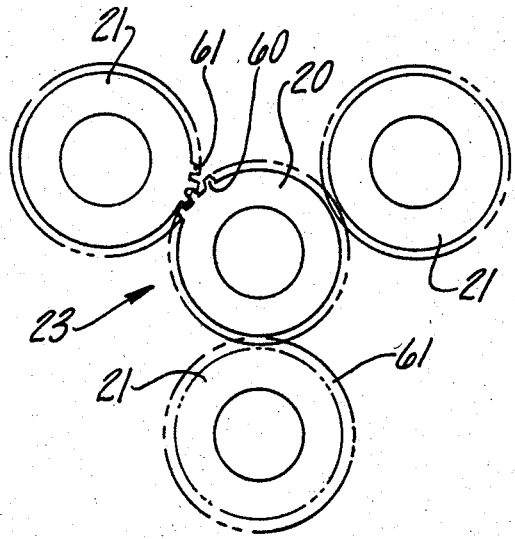
FIG. 7 is an end view of the central pinion gear attached to one end of the drive shaft in engagement with drive roller pinion gears fixed to one end of the drive rollers.

Referring to FIG. 7, first gear means 23 for transferring motion between the drive rollers 21 and the drive shaft 20 comprise central pinion gears 60 on opposite ends of the drive shaft 20 adjacent the end caps 19. Drive roller pinion gears 61 are similarly affixed to opposite ends of the drive rollers 21 and are adapted to engaged the central pinion gear 60 on the drive shaft 20. In this way when the belt 25 causes the drive rollers 21 to rotate the rotation of the drive rollers 21 is communicated positively through the drive roller pinion 61 and the central pinion gear 60 to the drive shaft 20.

The planetary rollers 30 in the illustrated embodiment are segmented rollers comprising a plurality of elongate arcuate segments 64 which are held in alignment by means of a spring biasing means 65 which is seated on a hub 66 and urges each of the arcuate segments 64 in a normally expanded condition. The planetary rollers 30 must be able to expand slightly at the critical transition point between the recess 45 and portion of the plane curve surface 15 of the opening 14 as it extends about the drive rollers 21. Depending upon the relationship of the lobes, planetary rollers, and plane curve surface, a limited amount of expansion of the roller is desirable to maintain the seal between adjacent chambers and to prevent slippage between the rollers 30, the endless belt 25, and the opening 14. The arcuate section 64 in the illustrated embodiment includes a flange 68 on one end of said arcuate segments 64 and a receptacle 69 on the other end for receiving the flange 68 of an adjacent arcuate segment 64. A seal 72 is preferably provided to supplement the sealing contact between the flange 68 and the receptacle 69 and prevent leakage from one chamber 32 to another.

A pre-heating stage may be included on the housing 12 to increase the efficiency of the rotary engine 10 by utilizing waste heat from the exhaust gases by passing the exhaust gases over a heat exchanger 74 attached to or formed in the housing between the intake port 17 and the heating means 37. The heat from the exhaust gases is transferred by the heat exchanger 74 to the chamber 32 adjacent the heat exhanger 74. The addition of heat at this point preheats the gas or fluid in the chamber and further pressurizes the gas or fluid prior the ignition phase of the cycle.

In operation, the rotary engine may operate as an internal combustion engine as shown in the illustrated embodiment, by drawing a mixture of air and fuel through the intake port 17 into the chamber 32 between the rollers (a) and (b) as shown in FIG. 1 and 2. FIG. 1 preceeds FIG. 2 in the cycle. It should be readily appreciated that as the planetary rollers move from the position shown in FIG. 1 to the position shown in FIG. 2 the volume of the chamber 32 between (a) and (b) increases thereby causing the air/fuel mixture to be drawn into the chamber. When the roller (a) passes by the intake port 17 the air/fuel mixture is sealed within the chamber 32 and the compression of the mixture commences by reason of the lobe 27 moving into the chamber between lobes (b) and (c) as it moves around the drive roller I.

As the endless belt 25 and the planetary rollers 30 continue moving, the lobe 27 will pass under the planetary roller (c) at the mid-point of the endless belt between drive rollers I and II. Heat exchanger 74 which is connected to exhaust port 18 transfers heat from the exhaust gases to the chamber between rollers (c) and (d) in FIG. 1 increasing the pressure in the chambers in that region by increasing the temperature of the air/fuel mixture.

As the cycle continuous the planetary roller (c) moves to the position shown in FIG. 1 as planetary roller (d) and the lobe 27 continues moving to the position shown as lobe 26 in FIG. 1.

As shown in FIG. 1, a high pressure condition is created in the chamber adjacent drive roller II when the lobe 26 is in the chamber between planetary rollers (d) and (e). At the position shown in FIG. 1 the rotary engine is ready for combustion and the spark plug 38 may ignite the pressurized air/fuel mixture in the chamber 32.

Immediately after ignition the roller (e) as shown in FIG. 2 is driven toward the low pressure area adjacent the exhaust port 18 and consequently drives the endless belt 25 clockwise until the combustion exhaust can be released through the exhaust port 18.

Each chamber undergoes the same cycle of intake, pressurization, combustion and exhaust in a continuous repetitive cycle. As the endless belt 25 is forced in the clockwise direction, the drive rollers 21 rotate causing the central pinion gear 60 and drive roller pinion gear 61 to turn the drive shaft 20 which provides rotary motion to a transmission or other power take off device.

It should also be understood that the rotary engine of the present invention may be used as an external combustion engine wherein the external thermal energy source is applied to the housing adjacent the housing at the point in which maximum pressure is developed by the co-location of one of the lobes 26, 27 in one of the chambers 32 as it passes over a drive roller 21.

It will be apparent to those skilled in the art that the foregoing disclosure is exemplary in nature rather than limiting, the invention being limited only by the appended claims.

I claim:

1. A rotary engine comprising:
    a housing having an elongate opening defined by a plane curve surface and being closed on first and second ends;
    an intake port extending from the opening through the housing;
    an exhaust port spaced from the intake port and extending from the opening through the housing;
    a drive shaft centrally located and extending from the first end to the second end of the housing;
    a plurality of drive rollers having fixed axes of rotation and being located adjacent and parallel to the drive shaft;
    first means interconnecting the drive shaft and the drive rollers for transmitting motion from the drive rollers to the drive shaft;
    a belt rotatably retained on the drive rollers and having lobes formed on the side of the belt opposite the drive rollers;
    a plurality of planetary rollers disposed between the plane curve surface of the housing and the belt for rotation and rolling movement relative to the housing within the opening, said planetary rollers forming a seal at a spaced location between the housing and the belt and defining a series of chambers between adjacent planetary rollers;
    second means interconnecting the housing with the planetary rollers and also interconnecting the planetary rollers to the belt for controlling the rolling movement of the planetary rollers in the opening and transferring the rotational movement of the planetary rollers to the belt; and
    third means disposed adjacent to the opening at a fixed location for heating and increasing the pressure in each of the chambers during a cycle when adjacent the third means, and for applying a force to the lobe driving said planetary rollers about the opening causing the planetary rollers, drive rollers, and drive shaft to be rotatably driven.

2. The rotary engine of claim 1 wherein said third means comprises a spark plug mounted in said housing, and wherein an air/fuel mixture is supplied through the intake port into said chambers and is compressed as the chambers move about the opening until the chambers reach the third means wherein the spark plug causes combustion which drives the planetary rollers.

3. The rotary engine of claim 1 wherein said third means comprises a thermal energy source disposed on the housing to heat said housing, said heat being transferred through the housing to a fluid in said chambers as each passes said fixed location, said fluid being drawn into the housing through the intake port and being expelled from the housing under pressure through the exhaust port.

4. The rotary engine of claim 1 wherein said drive rollers are spaced equidistant from one another and said belt extends substantially linearly from one drive roller to another, said planetary rollers being positioned in said opening to roll over the lobes of the belt as the lobes pass a midpoint between adjacent drive rollers, and the plane curved surface of the opening includes a recess opposite the midpoint to provide clearance for said planetary rollers to pass said lobes.

5. The rotary engine of claim 4 wherein three of said drive rollers are arranged in a triangular array, two lobes are formed on said belt, and five planetary rollers are disposed between the belt and the opening, and said third means is located in the housing directly opposite side of the belt from one of said drive rollers.

6. The rotary engine of claim 5 wherein said third means is a spark plug timed to ignite an air/fuel mixture in the chamber adjacent said one drive roller as each of said lobes pass said one drive roller whereby each of said lobes compresses the air/fuel in the chamber adjacent the one drive roller to facilitate combustion of the air/fuel mixture in the chamber.

7. The rotary engine of claim 4 wherein said recess is a curved surface having the same shape and dimensions as the lobes of the belt.

8. The rotary engine of claim 7 wherein a portion of said plane curve surface is approximately in the shape of a surface formed by rolling one of the planetary rollers over the opposite side of the belt from the drive rollers when the lobes of the belt are between the adjacent planetary rollers.

9. The rotary engine of claim 1 wherein the belt is comprised of a plurality of links interconnected to form an endless belt, said links being interconnected to form a seal between each link in the endless belt.

10. The rotary engine of claim 9 wherein first and second groups of said links include a series of projections of symmetrically increasing length on opposite sides of a maximum length projection.

11. The rotary engine of claim 10 wherein said lobes are substantially trochoidial in shape.

12. The rotary engine of claim 1 wherein said second means comprises a plurality of circumferentially spaced studs extending from opposite ends of the planetary rollers toward the first and second ends of the opening, a first set of complementary gear teeth on the belt to engage the studs, and second set of complementary gear teeth formed on the plane curve surface of the opening adjacent the first and second ends to engage the studs.

13. The rotary engine of claim 12 wherein ring seals are attached to the ends of the planetary rollers spanning the spaces between the studs to maintain the seal from one side of the planetary roller to the other side of said planetary roller.

14. The rotary engine of claim 1 wherein said first means comprises first and second central pinion gears fixed to the drive shaft adjacent said first and second ends, and first and second drive roller pinion gears fixed to opposite ends of the drive rollers to mesh with the first and second central pinion gears of the drive shaft.

15. The rotary engine of claim 2 wherein exhaust gases are channeled from said exhaust port to a heat exchanger disposed on the housing at a point between the intake port and the third means to preheat said air/fuel mixture before reaching the fixed location of the third means.

16. The rotary engine of claim 1 wherein said planetary rollers are slightly expandable.

17. The rotary engine of claim 16 wherein said planetary rollers are formed of a plurality of arcuate segments urged into a cylindrical configuration by spring biasing means to permit a limited degree of compression and expansion of said rollers as said rollers move about the opening.

18. The rotary engine of claim 17 wherein said arcuate segments include interlocking elements on adjacent segments and further include seal elements as integral parts of said interlocking elements to form a seal across said rollers.

* * * * *